(12) United States Patent
Davies et al.

(10) Patent No.: US 6,497,853 B1
(45) Date of Patent: *Dec. 24, 2002

(54) DIAMOND GROWTH

(75) Inventors: Geoffrey John Davies, Randburg (ZA); Raymond Albert Chapman, Johannesburg (ZA); Aulette Stewart, Randburg (ZA); Lesley Kay Hedges, Brackenhurst (ZA)

(73) Assignee: Moosa Mahomed Adia, Benoni (ZA)

( * ) Notice: Subject to any disclaimer, the term of this patent is extended or adjusted under 35 U.S.C. 154(b) by 0 days.

This patent is subject to a terminal disclaimer.

(21) Appl. No.: 09/403,017

(22) PCT Filed: Apr. 16, 1998

(86) PCT No.: PCT/GB98/01112

§ 371 (c)(1), (2), (4) Date: Nov. 23, 1999

(87) PCT Pub. No.: WO98/46343

PCT Pub. Date: Oct. 22, 1998

(30) Foreign Application Priority Data

Apr. 17, 1997 (ZA) .............................................. 97/3282

(51) Int. Cl.[7] .............................................. C01B 31/06
(52) U.S. Cl. ...................................................... 423/446
(58) Field of Search .......................................... 423/446

(56) References Cited

U.S. PATENT DOCUMENTS 6,270,548 B1 * 8/2001 Campbell et al. ........... 423/646

FOREIGN PATENT DOCUMENTS

GB 1541847 * 3/1979

* cited by examiner

Primary Examiner—Stuart L. Hendrickson
(74) Attorney, Agent, or Firm—Oblon, Spivak, McClelland, Maier & Neustadt, P.C.

(57) ABSTRACT

Diamond crystals may be grown by providing a source of diamond crystals, providing a plurality of growth centers defined by diamond crystals, mixing the source and growth center diamond crystals with a solvent/catalyst in particulate form to form a reaction mass, subjecting the reaction mass to conditions of elevated temperature and pressure suitable for crystal growth, and recovering the diamond crystals. The necessary supersaturation of carbon is achieved in the solvent/catalyst, at least in part, and preferably predominantly, by a selection of the particle size difference between the source crystal and the growth centers. The mass of diamond crystals produced by this method has a high concentration of twinned diamonds.

13 Claims, 6 Drawing Sheets

FIG. 1

STAR TWIN

FIG.2

STAR TWIN

FIG.3

STAR TWIN

FIG.4

CUBE CONTACT-TWINNED ALONG A {111} PLANE

FIG.5

STAR TWIN

FIG.6

AGGREGATE OF TWINNED CRYSTALS

FIG.7

SYNTHETIC MACLE TWINS - PLATES

FIG.8

SYNTHETIC MACLE TWINS - PLATES

FIG.9

ELONGATE STAR TWINS

FIG.10

DIAMOND GROWTH

This is a National Stage application of PCT/6B98/01112, filed Apr. 16, 1998.

BACKGROUND OF THE INVENTION

This invention relates to the growth of diamond under conditions of high temperature and high pressure.

The synthesis of crystals at high temperatures and high pressures, particularly diamond, is very well established. There are two principle methods employed, both from solution, namely a temperature gradient method and an allotropic change method. In the temperature gradient method, the driving force for crystal growth is the supersaturation due to the difference in solubilities of the source material and the growing crystal as the result of a temperature difference between the two. In the allotropic change method, the driving force for crystal growth is the supersaturation due to the difference in solubilities of the source material and the growing crystal as the result of an allotropic (or polymorphic) difference between the two.

SUMMARY OF THE INVENTION

According to the present invention, a method of growing diamond crystals includes the steps of providing a source of diamond crystals, providing a plurality of growth centers defined by diamond crystals. The quantity of source crystals generally being greater than that of the growth centers, producing a reaction mass by bringing the source and growth centers into contact with a solvent/catalyst, subjecting the reaction mass to conditions of elevated temperature and pressure suitable for crystal growth. The necessary supersaturation of carbon in the solvent/catalyst being achieved, at least in part, and preferably predominantly, by a selection of particle size difference between the source crystal and the growth centers, and recovering the diamond crystals from the reaction mass.

The invention allows for the growth of diamond crystals using supersaturation created, at least in part, by a difference in particle size between the source crystals and the growth centers. The source crystals and growth centers may be provided by particles at opposite ends of a particle size range. Thus, in this case, the growth centers will be provided by crystals at the higher end of the particle size range, whilst the source crystals will be provided at the lower end of the particle size range. The quantity of crystals, i.e. number of crystals, at the lower end of the range will generally be much greater than that at the higher end of the range.

The source crystals will be smaller than the growth centers. The size of the source crystals will thus depend on the size of the growth centers. It has been found that particularly good diamond growth is achieved if the source crystals have a size of less than 20 microns and generally less than 15 microns.

The growth centers may also be provided by seed crystals which are separate and distinct from the source crystals. Such seed crystals will generally be substantially larger than the source crystals. An example of this form of the invention is to use particles of a size less than 10 microns as source crystal particles and seed crystals having a size substantially greater than 10 microns as growth centers. The seed crystals may, for example, be greater than 40 microns. The quantity of source crystals will again generally be much greater than that of the seed crystals.

The method of the invention, it has been found, produces a mass of diamond crystals in which at least 40 percent, typically at least 80 percent, and generally substantially the entire mass, consists of synthetic twinned diamonds. The twinned diamonds include contact twins, macle twins, including multiple and single made twins, polysynthetic twins and star twins. Various shapes of twin diamonds are produced and these include blocky or cube shape, plate shape and column shape. For the plate and column shaped diamonds, the crystals have a high aspect ratio, i.e. a high ratio of longest dimension to shortest dimension. A mass of twinned diamond crystals of this nature is believed to be new and forms another aspect of the invention.

BRIEF DESCRIPTION OF THE PHOTOGRAPHS

The photographs which form

DESCRIPTION OF EMBODIMENTS

The growth center crystals may be provided by the diamond crystals themselves. They can also be provided by a particle other than diamond such as silicon carbide or by a particle comprising a core of a material other than diamond having a cladding or coating of diamond.

Examples of solvent/catalysts for diamond include transition metals such as iron, cobalt, nickel, manganese and alloys containing any one of these metals, stainless steels, superalloys (e.g. cobalt. nickel and iron-based), bronzes and brazes such as nickel/phosphorus, nickel/chromium/phosphorus and nickel/palladium. Other suitable solvent/catalysts for diamond synthesis are elements, compounds and alloys not containing transition metals, e.g. copper, copper/aluminium and phosphorus, and non-metallic materials or a mixture thereof such as alkaline, alkaline earth metal hydroxides, carbonates and sulphates.

The source particles may be synthetic diamond, including polycrystalline diamond, produced by conventional high pressure/high temperature processes. The source particles may also be natural diamond (including carbonado), shockwave diamond or CVD diamond, i.e. diamond produced by chemical vapour deposition. The growth center diamonds may be of a similar or different type, except they will, of course, always be larger in size than the source diamonds.

The seed crystals may have well-developed facets and be devoid of twin planes, e.g. cubes, octahedra and cubo-octahedra, or they may contain twin planes. The seed crystals may be irregular, rounded or spheroidal. The seed crystals may be coated or clad, e.g. with solvent/catalyst.

The conditions of elevated temperature and pressure which are used in the method are known in the art. The synthesis conditions may be those under which diamond is thermodynamically stable. These conditions are well known in the art. Generally, the elevated temperature will be in the range 1200 to 1500° C. and the elevated pressure will be in the range 50 to 70 kilobars (5 to 7 GPa). These elevated temperature and pressure conditions will be maintained for a period sufficient to allow the crystal growth to occur. The time will generally be greater than 15 minutes and can be up to an hour or longer.

It is also possible to produce diamond growth under conditions which are outside the region of thermodynamic stability of diamond. Conditions of temperature and pressure outside the region of thermodynamic stability of diamond can be used if the Ostwald rule dominates the growth process rather than the Ostwald-Volmer rule (see Bohr. R Haubner and B Lux Diamond and Related Materials volume 4, pages 714–719, 1995)—"According to the Ostwald rule, if energy is withdrawn from a system with several energy states, the system will not reach the stable ground state directly, but instead will gradually pass through all intermediate states. In addition, according to the Ostwald-Volmer rule, the less dense phase is formed (nucleated) first. Where the two rules would appear to contradict each other, the Ostwald-Volmer rule has priority over the Ostwald rule." In the case of diamond crystal growth outside its region of thermodynamic stability, the Ostwald-Volmer rule can be suppressed by, for example, the application of pressure, thus allowing the growth of diamond on pre-existing diamond particles, provided graphite crystals are substantially absent. Although isothermal and isobaric conditions are not essential to the practice of this invention, such conditions are preferred as then the process can be more easily controlled.

The source crystals and the growth center crystals are brought into contact with a suitable solvent/catalyst to create a reaction mass. Generally, the crystals will be mixed with the solvent/catalyst in particulate form. There must be sufficient source crystal to create supersaturation of carbon in the solvent/catalyst. Solution of the source crystal in the solvent/catalyst may be in solid or liquid state. The content of source and growth center diamond in the reaction mass will generally be at least 10% by volume and generally less than 80% by volume. A typical content is 30% by volume.

The reaction mass may be placed in the reaction zone of a conventional high temperature/high pressure apparatus and the contents then subjected to the elevated conditions of temperature and pressure necessary for achieving the crystal growth. The source material dissolves preferentially with respect to the larger growth center crystals in the solvent/catalyst. The carbon solute migrates to the growth centers and precipitates or grows thereon. The crystals which are produced will have a morphology and twinning nature which is dependent on the saturation-time profile utilised. The temperature and pressure conditions and chemical composition of the solvent/catalyst also influence morphology.

Crystallisation and crystal structure modifiers such as nitrogen, boron or phosphorus may be introduced into the reaction mass to achieve specific objectives.

Recovery of the diamond crystal from the reaction mass may be carried out by methods well known in the art, e.g. by dissolving the solvent/catalyst using a strong inorganic acid.

As mentioned above, the method of the invention results in a mass of diamond crystals being produced in which at least 80 percent, and generally substantially the entire mass, consists of twinned diamonds. This is so irrespective of the shape of the growth center diamonds used. The mass of twinned diamond crystals may be used in a variety of applications such as sawing, grinding, polishing, drilling, single-point turning, milling, wire drawing and as wear surfaces.

When the twinned diamond crystals have a high aspect ratio, such as plate-shaped diamonds and column-shaped diamonds, the opportunity is presented to orientate the crystals with respect to tool geometry and achieve better keying. For example, plates may be located with a long axis in the direction of tool motion, and column-shaped particles can be orientated in circular saw blades. The presence of twin planes may allow the characteristics of the particles to be changed.

Examples of twinned diamond crystals produced by the method of the invention are illustrated in photographs 1 to 10. FIGS. 1 to 7 are scanning electron micrographs and FIGS. 8 to 10 optical photographs, taken at between 30 and 150 times magnification.

Figure 1:
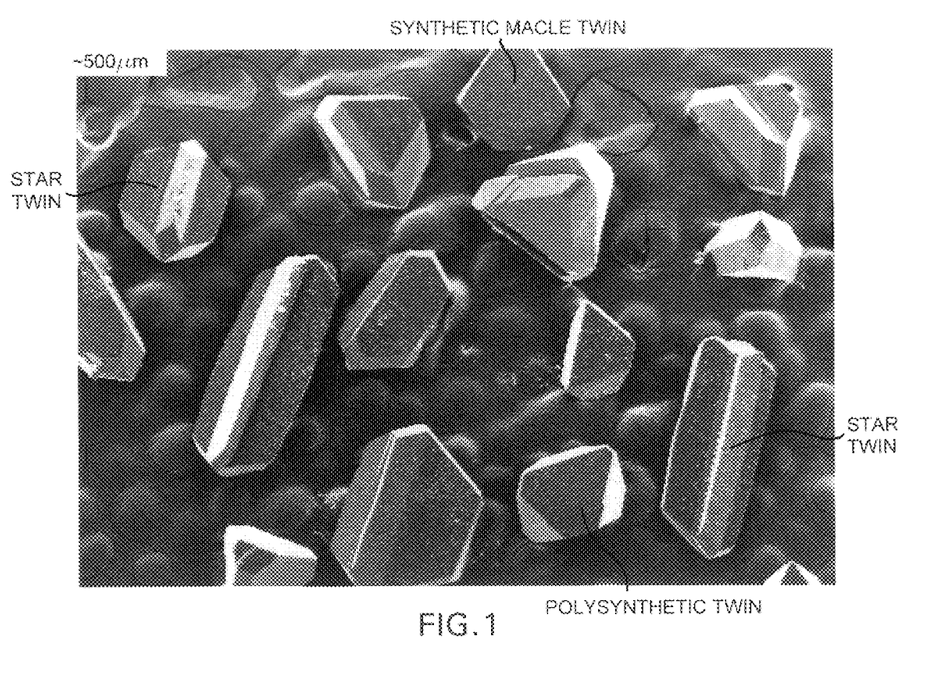
FIGS. 1 to 10 show examples of twinned diamond crystals produced by the method of the invention.
Figure 2:
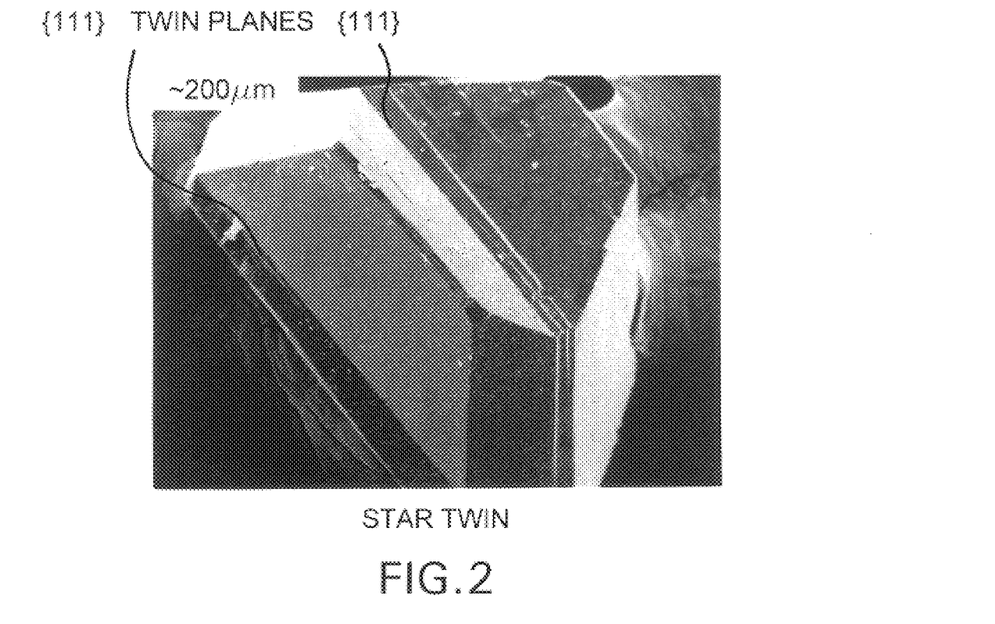
Figure 3:
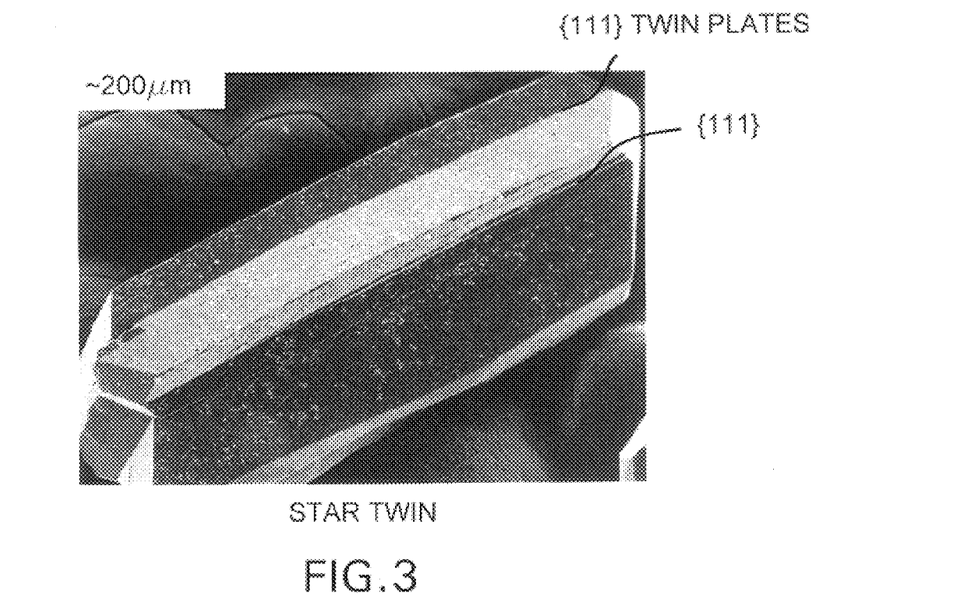
Figure 4:
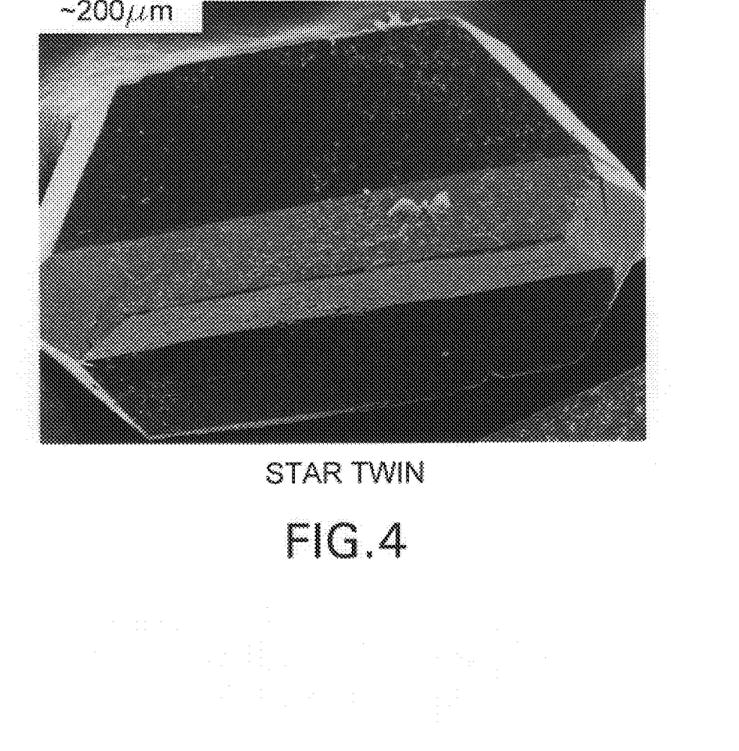

The photograph of FIG. 1 shows examples of star twin crystals, polysynthetic twin crystals and synthetic made twin crystals.

FIGS. 2, 3, 4 and 6 are photographs of star twin diamond crystals from different angles. Star twinning is a form of cyclic twinning involving non-parallel {111} twin planes. Some of the {111} twin planes are identified in FIGS. 2, 3 and 6.

Figure 5:
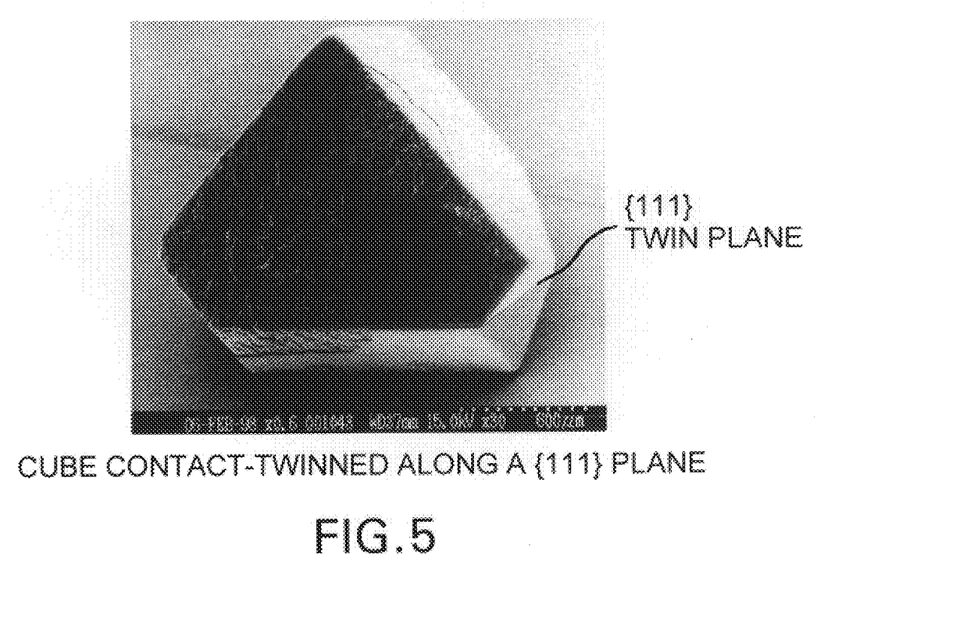
Figure 6:
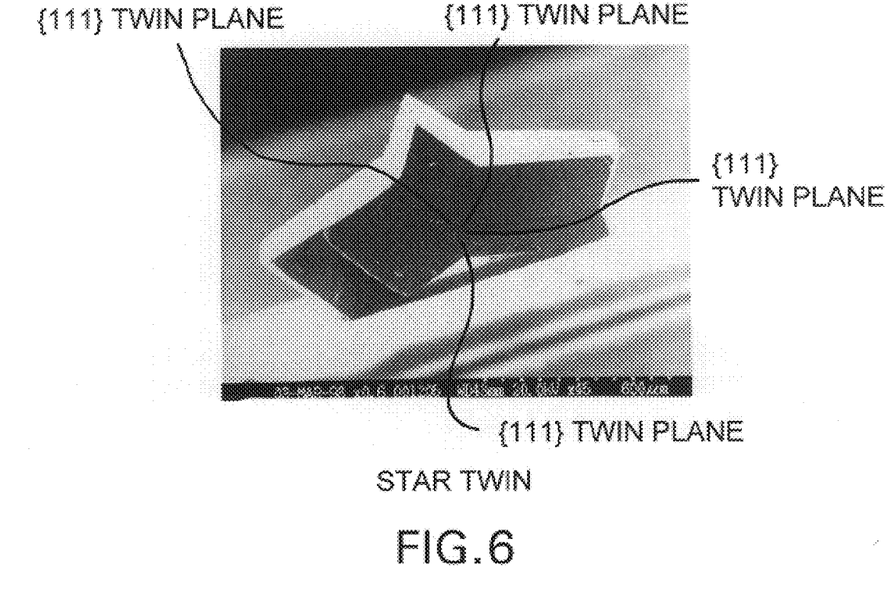

FIG. 5 illustrates a cube crystal contact-twinned along a {111} plane. The corner at the top of the photograph is that of a cube— the three edges meeting at the point are mutually perpendicular. The {111} twin plane is identified.

Figure 7:
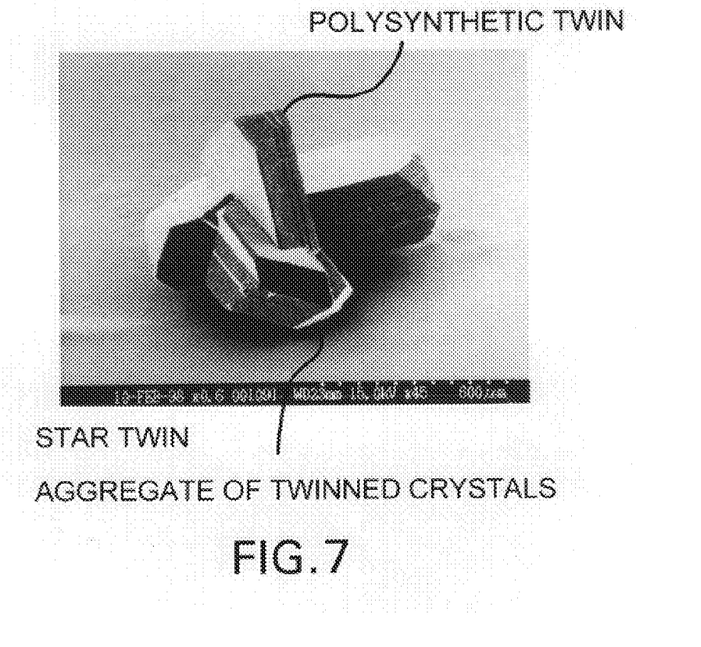

FIG. 7 shows an aggregate of three intergrown twinned crystals. Two crystals (one almost vertical and the largest—almost horizontal) display polysynthetic twinning which involves a series of parallel composition planes. The crystal directed towards the viewer displays star twinning. Viewed end on, the crystal appears like a five sided star.

Figure 8:
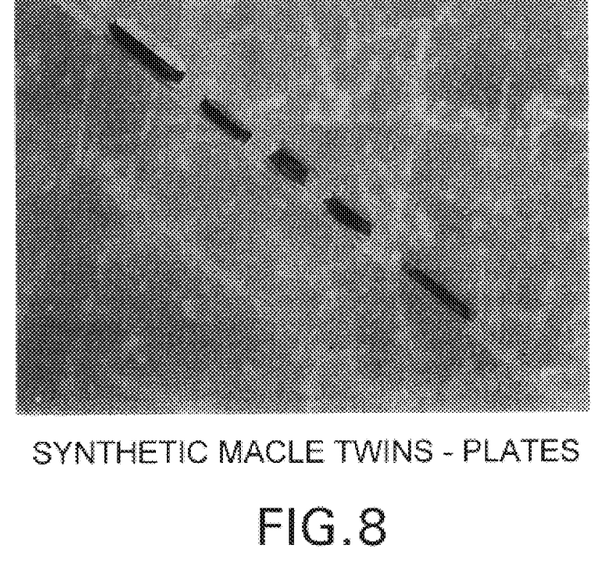
Figure 9:
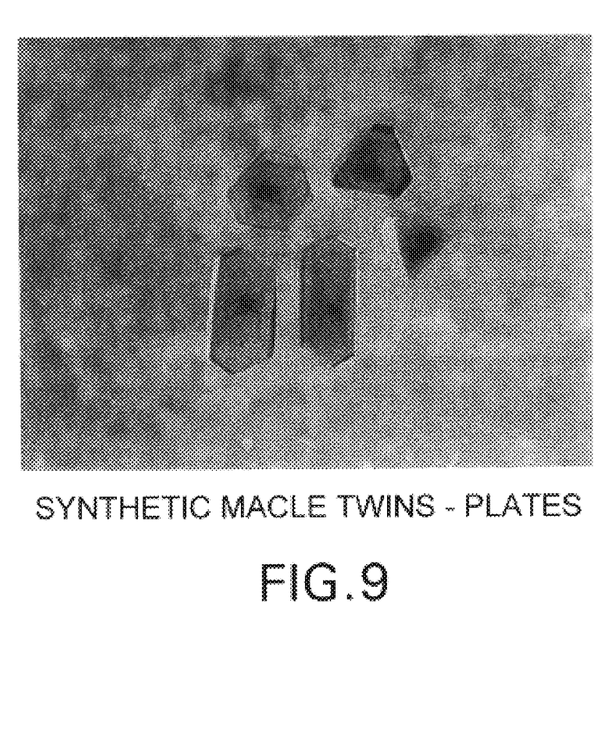

FIGS. 8 and 9 are photographs of synthetic macle twin plates from different angles. The high aspect ratio is to be noted.

Figure 10:
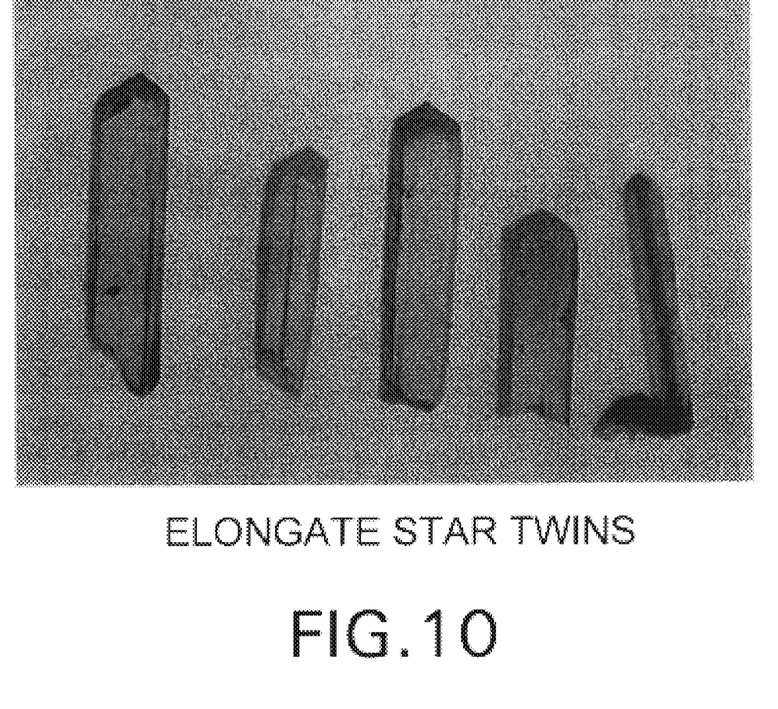

FIG. 10 is a photograph of an elongated star twin diamond crystal. Again, the high aspect ratio is to be noted.

The invention will be illustrated by the following examples.

EXAMPLE 1

A reaction capsule described above was used to produce a plurality of diamond crystals. A mixture was made of (a) 0.01 g diamond seed particles, approximately 75 microns in size and produced by crushing coarser synthetic material, (b) 50 g source diamond powder, less than 0.5 micron in size and produced by crushing coarser synthetic material. and (c) 285 g cobalt iron (65Co. 35Fe) solvent/catalyst. The mixture was placed in the reaction capsule and raised to conditions of about 55 kilobars and about 1380° C. These conditions were maintained for a period of 21 hours. The resultant crystals were predominantly twinned. The total mass of crystals recovered using conventional recovery techniques was 31 g, of which 71.5% were greater than 70 US mesh (210 microns).

EXAMPLE 2

A reaction capsule described above was again used to produce a plurality of diamond crystals. A mixture was made of (a) 50 g diamond powder, with a maximum size of 8 microns and 50% by mass less than 1 micron, produced by crushing coarser synthetic material, and (b) 284.6 g cobalt iron (65Co. 35Fe) solvent/catalyst. No seeds were included in the mixture. The mixture was placed in the reaction capsule and raised to conditions of about 55 kilobars and about 1370° C. These conditions were maintained for a period of 210 minutes. The grown crystals were predominantly twinned, and ranged in size from 80 US mesh (177 microns) to 40 US mesh (420 microns).

In Examples 1 and 2, a cobalt iron solvent/catalyst was used. Twinned diamond crystals were produced using different catalyst/solvents. These Examples, and conditions used, are set out in the table hereinafter. In each of Examples 3 to 17, the diamond source and seed was a synthetic diamond.

| Example | Solvent/Catalyst | Pressure (kbar) | Temperature (° C.) | Time (mins) | Source Size range (microns) | Seed size (microns) | Result (size µm) |
|---|---|---|---|---|---|---|---|
| 3 | 100% Co | 53.0 | 1400 | 660 | 0–0.5 | none | 150–160 |
| 4 | 100% Ni | 54.8 | 1410 | 660 | 0–0.5 | none | 200–1000 |
| 5 | 65Co.35Fe | 53.0 | 1370 | 1020 | 0–0.5 | 65–75 | 150–300 |
| 6 | 70Fe.30Ni | 55.0 | 1430 | 600 | 6–12 | none | 10–20 |
| 7 | 70Fe.30Ni | 54.2 | 1250 | 60 | 0–0.5 | none | 50–150 |
| 8 | 52Mn.48Ni | 54.2 | 1410 | 660 | 0–0.5 | 49–65 | 80–200 |
| 9 | 56Cu.30Co.14Sn | 54.2 | 1410 | 660 | 0–0.5 | 49–65 | 200–700 |
| 10 | 60Co.32Cu.8Sn | 54.2 | 1410 | 660 | 0–0.5 | 49–65 | 200–700 |
| 11 | 40Cu.26Mn.24Ni.10Sn | 54.2 | 1410 | 660 | 0–0.5 | 49–65 | 150–350 |
| 12 | 68Cu.17Sn.15Co | 54.2 | 1410 | 660 | 0–0.5 | 49–65 | up to 60 |
| 13 | 100% Cu | 54.2 | 1420 | 660 | 0–0.5 | none | up to 30 |
| 14 | 89Ni.11P | 54.2 | 1250 | 660 | 0–0.5 | none | 50–250 |
| 15 | 77Ni.13Cr.10P | 54.2 | 1410 | 660 | 0–0.5 | none | 100–750 |
| 16 | 80Cu.20Sn | 55.0 | 1460 | 660 | 0–0.5 | none | up to 30 |
| 17 | 60Cu.40Sn | 55.0 | 1460 | 660 | 0–0.5 | none | up to 30 |

The invention is illustrated further by the Examples 18 to 25 in which the source and growth center diamond particles constituted opposite ends of a particle size range. Twinned diamond crystals were produced. The conditions used in the Examples are set out hereinafter. In these examples and in examples 26 to 32, an iron nickel or cobalt iron catalyst/solvent was used.

| Example | Size Range (microns) | Diamond type | Pressure (kbar) | Temperature (° C.) | Time (mins) | Result Size (µm) |
|---|---|---|---|---|---|---|
| 18 | 0–0.5 | synthetic | 54.2 | 1220 | 60 | 50–150 |
| 19 | 0.5–1.0 | synthetic | 54.2 | 1220 | 60 | up to 30 |
| 20 | 1.0–2.0 | synthetic | 54.5 | 1330 | 600 | 20–60 |
| 21 | 3–6 | synthetic | 54.5 | 1330 | 600 | 10–20 |
| 22 | 6–12 | synthetic | 55.0 | 1430 | 600 | 10–20 |
| 23 | 8–16 | synthetic | 56.0 | 1460 | 600 | 200–400 |
| 24 | 0–0.4 | shock wave | 54.5 | 1380 | 660 | up to 80 |
| 25 | 0–0.5 | natural | 54.2 | 1350 | 180 | 200–400 |

Examples 26 to 32 illustrate the production of twinned diamond crystals using different types and sizes of source and seed crystals. The conditions used and results obtained are set out hereinafter.

| Example | Source size (microns) | Seed size (microns) | Seed type | Seed shape | Temperature (° C.) | Pressure (kbar) | Time (mins) | Result Size (µm) |
|---|---|---|---|---|---|---|---|---|
| 26 | 0–0.5 | 65–75 | synthetic diamond | angular & irregular | 1370 | 53.0 | 1020 | 150–300 |
| 27 | 0–0.5 | 149–177 | natural diamond | angular & irregular | 1370 | 53.0 | 660 | 250–1000 |
| 28 | 0–0.5 | 297–420 | natural diamond | rounded | 1370 | 53.0 | 60 | 300–1200 |
| 29 | 1.5–3.0 | 62–74 | synthetic diamond | faceted cuboctahedra | 1410 | 54.5 | 660 | 200–600 |
| 30 | 0–0.5 | 15–30 | synthetic diamond | faceted octahedra | 1400 | 55.0 | 600 | 150–1000 |
| 31 | 0–0.5 | 57–85 | crushed CVD diamond | twinned crystals | 1400 | 55.0 | 600 | up to 2000 |
| 32 | 0–05 | 177–250 | synthetic diamond | twinned crystals | 1400 | 55.0 | 600 | up to 2000 |

What is claimed is:

1. A method of growing diamond crystals includes the steps of providing a source of diamond crystals, providing a plurality of growth centres defined by diamond crystals, producing a reaction mass by mixing the source and growth centres of different particle sizes with a solvent/catalyst in particulate form, subjecting the reaction mass to isothermal conditions of elevated temperature and pressure suitable for crystal growth, the recovering twinned diamond crystals from the reaction mass in an amount of at least 40 percent.

2. A method according to claim 1 wherein the content of source and growth centre diamond in the reaction mass is less than 80 percent by volume.

3. A method according to claim 1 wherein the source crystals and growth centres are provided by particles at opposite ends of a particle size range.

4. A method according to claim 1 wherein the growth centres are provided by seed crystals.

5. A method according claim 1 wherein the source crystals are present in an amount greater than that of the growth centre crystals.

6. A method according claim 1 wherein the source crystals have a size of less than 20 microns.

7. A method according to claim 6, wherein the growth center crystals have a particle size greater than 40 microns.

8. A method according to claim 1 wherein the solvent/catalyst includes a transition metal.

9. A method according to claim 8 wherein the transition metal is selected from iron, cobalt, nickel, manganese and alloys containing any one of these metals.

10. A method according to claim 1 wherein the conditions of elevated temperature and pressure are those under which diamond is thermodynamically stable.

11. A method according to claim 10 wherein the elevated temperature is in the range 1200 to 1500° C., and the elevated pressure is in the range 50 to 70 kilobars (5 to 7 GPa).

12. A method according to claim 1 wherein the elevated temperature and pressure conditions are maintained for a period of at least 15 minutes.

13. A method according to claim 1 wherein the content of source and growth centre diamond in the reaction mass is at least 10 percent by volume.

* * * * *